United States Patent [19]

Kobayashi et al.

[11] Patent Number: 4,838,518

[45] Date of Patent: Jun. 13, 1989

[54] PRESSURE CONTROL VALVE

[75] Inventors: Kouji Kobayashi, Toyota; Akira Suzuki; Nobuaki Miki, both of Obu, all of Japan

[73] Assignee: Aisin An Co., Ltd., Anjo, Japan

[21] Appl. No.: 198,410

[22] Filed: May 25, 1988

[30] Foreign Application Priority Data

May 28, 1987 [JP] Japan .................................. 62-133591

[51] Int. Cl.$^4$ ............................................. F15B 13/044
[52] U.S. Cl. ........................... 251/129.16; 137/625.65; 251/129.17
[58] Field of Search .............. 137/625.65; 251/129.15, 251/129.16, 129.17; 335/262

[56] References Cited

U.S. PATENT DOCUMENTS

| 4,250,922 | 2/1981 | Will et al. ......................... 137/625.65 |
| 4,535,816 | 8/1985 | Feder et al. . |
| 4,635,683 | 1/1987 | Nielsen ............................. 137/625.65 |
| 4,662,605 | 5/1987 | Garcia ........................... 137/625.65 X |

FOREIGN PATENT DOCUMENTS

| 2206751 | 8/1973 | Fed. Rep. of Germany ........................ 251/129.15 |
| 2117872 | 10/1983 | United Kingdom ........... 137/625.65 |

*Primary Examiner*—Gerald A. Michalsky
*Attorney, Agent, or Firm*—Frank J. Jordan; C. Bruce Hamburg; Manabu Kanesaka

[57] ABSTRACT

A pressure control valve includes pressure modulating section and a magnetic section. The magnetic section has a cylindrical case, a coil assembly, a cylindrical core, a rod and a plunger. The plunger is made of thick magnetic material. At the center of the plunger, a cylindrical concave whose diameter is slightly larger than that of the cylindrical core is provided. The end of the cylindrical core composes an extrusion by extending from the coil assembly. A magnetic attractive section made up by the cylindrical concave of the plunger and the extrusion of the cylindrical core both of which are located vis-a-vis each other, and is located away from the pressure modulating section. Due to the above, when operation the plunger is efficiently magnetized and attracted to the extrusion of the core. And even if fluid leaks from the pressure modulating section, it is difficult for the fluid to reach the magnetic attractive section.

5 Claims, 3 Drawing Sheets

PRESSURE CONTROL VALVE

BACKGROUND OF THE INVENTION

1. Field of the Invention

The present invention relates to a pressure control valve which controls fluid pressure in accordance with electrical signals. Typical types of the pressure control valve are a diaphragm type receiving a feedback pressure on the diaphragm, and a spool type receiving the feedback pressure on a spool end. The present invention relates to both types of pressure control valve, particularly to the structure of magnetic section.

2. Description of The Prior Art

A pressure control valve, as shown in U.S. Pat. No. 4,535,816, has a pressure modulating section, and a magnetic section having a coil assembly, a core and a rod being placed coaxially with, and pressed by a spring toward the modulating section. And a spring is attached to a plunger. A cylindrical extrusion made at the center of the plunger and a cylindrical concave, made on the inner surface of the core end, whose diameter is slightly larger than that of the cylindrical extrusion are located vis-a-vis near the pressure modulating section so that they composes a magnetic attractive section.

Accordingly as the above mentioned pressure control valve is so made that the cylindrical extrusion of the plunger is inserted into the cylindrical concave of the core end, to obtain magnetic attractive force in the magnetic attractive section, the diameter of the cylindrical extrusion of the plunger can not be made small. Because of the above, diameters of the cylindrical core and the coil assembly become large, so that it is difficult to design the magnetic section compact in its radial direction. The degree of freedom of system design in the case of the pressure control valve, for example, which is used in the hydraulic control circuit of automatic transmission is limited because the pressure control valve occupies certain area in a limited space. As stated, the magnetic attractive section in the magnetic section is located near the pressure modulating section, so fraction iron, etc. are easily caught by the magnetic attractive section, then, it is possible to occur malfunctions.

SUMMARY OF THE INVENTION

An objective of the present invention is to make radial dimension of a magnetic section small and provide a pressure control valve having a structure preventing foreign material from entering a magnetic section.

Accordingly, the present invention is explained as follows: a pressure control valve (1) includes the pressure modulating section (2) and the magnetic section (3). The magnetic section (3) has a cylindrical case (32), a coil assembly (35) which is installed concentrically in the case (32), a cylindrical core (33) which is installed concentrically in the coil assembly (35), a rod (36) which moves along by the center of the core (33), and a plunger (37) which is fixed on one end of the rod (36). The plunger (37) is so made that a cylindrical concave (37a) has slightly larger diameter than that of the core (33). And the concave (37a) is made of thick disc type magnetic material, and an end of the core (33) is extruded from the coil assembly (35) as an extrusion (33c), so that the cylindrical concave (37a) and the extrusion (33c) making up the magnetic attractive section in the magnetic section (3), are set vis-a-vis at the place away from the pressure modulating section (2).

Based on the above structure, the pressure control valve (1) works corresponding to electric level input to the magnetic section (3), and output hydraulic pressure corresponding to input electric level. At this time, the coil assembly (35) is magnetized by electric level input at the magnetic section (3), so magnetic circuit connecting the core (33), plunger (37) and the case (32) is formed. Magnetic flux passing through the core (33) runs through the surface and end of the extrusion (33c), the outer surface of the plunger (37b) and the case (32). The plunger (37) is efficiently magnetized, and is attracted to the core (33) and the extrusion (33c) by large magnetic force. Under the operation, even if the working fluid leaks from the pressure modulating section (2), it is difficult for the fluid to reach the magnetic section (3) easily because the magnetic attractive section included in the magnetic section is located away form the pressure modulating section (2).

DETAILED DESCRIPTION OF THE PREFERRED EMBODIMENTS

The embodiments of the present invention are explained along by the drawings.

Figure 1:
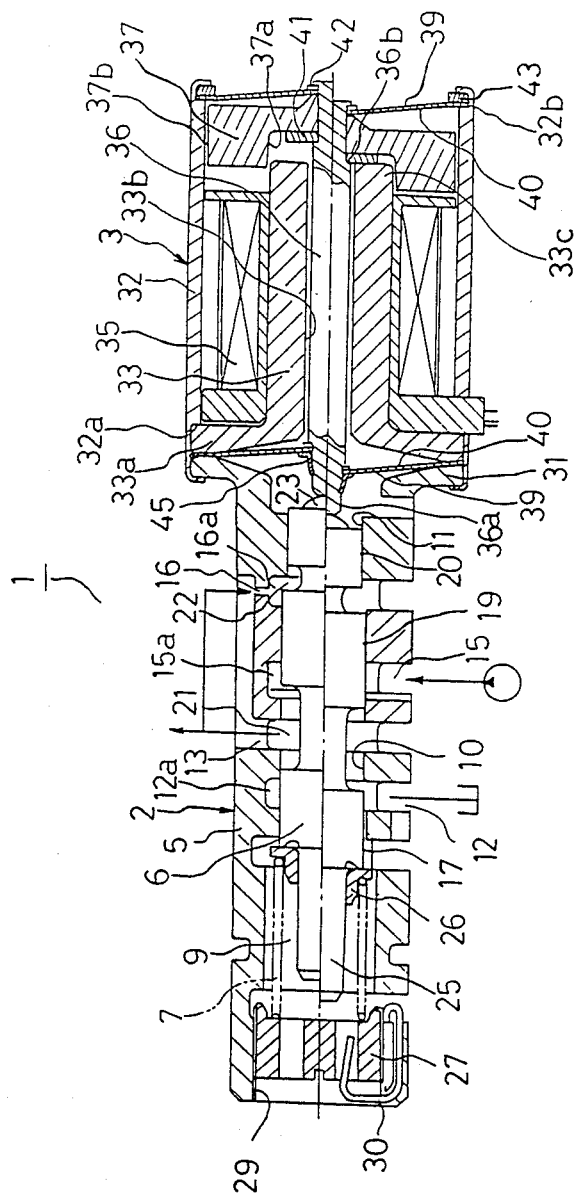
FIG. 1 is a cross sectional view of the pressure control valve, showing the first embodiment, related to the present invention.

A pressure control valve 1, shown in FIG. 1, has a pressure modulating section 2 and a magnetic section 3.

The pressure modulating section has a valve sleeve 5 and a spool 6. The valve sleeve 5 has a large hole 9, a middle hole 10 and a small hole 11. The large hole 9 contains a spring 7 in axial direction and the middle hole 10 contains the spool 6. On the circumference of the valve sleeve 5 along the middle hole 10, an drain port 12, an output port 13 and an application port 15 are laid in this sequence. On the border of the holes 10 and 11 of the valve sleeve 5, a feedback port 16 having a throttle passage is provided. And to make fluid flow smooth at each port, ringed dents 12a, 15a and 16a are provided. The spool 6 has the lands 17 and 19 having same diameters, and the land 20 which has different diameter and is close to the land 19. The lands 17 and 19 are movable in the middle hole 10 and the land 20 is movable in the small hole 11. The space between the land 17 and 19 is so set that the output port 13 is connected to both the application port 15 and drain port 12 according to certain ratio of openings made by the spool 6. A space 21 between the lands 17 and 19 is always connected to the output port 13 without changing opening ratio. On the other hand, a space 22 surrounded by the lands 19, 20 and the holes 10 and 11 is always connected to the feedback port 16. In FIG. 1, a half-ball type extrusion 23 at the center of the land 20 is a contact point to the rod 36. A bar member 25 extended from the center of the land 17 is a guide member for the spring 7 and a stroke limiter for the spool 6.

The assembly of pressure modulating section 2 is that; from one end of the hole 9 the spool 6 attaching a washer 26 on the bar member 25 is inserted; this time the spool 6 is inserted from the left to the right in FIG. 1; a male thread member 27 screws a female thread member 29 of the valve sleeve 5 so that compression is provided to the spring 7 at the same time the spring 7 is held by the washer 26; the male thread member 27 is fixed to the valve sleeve 5 by a pin 30. After the assembly of the pressure modulating section 2, this section 2 is coupled with the magnetic section 3 by caulking a brim of a case 32 to a flange 31.

Figure 2:
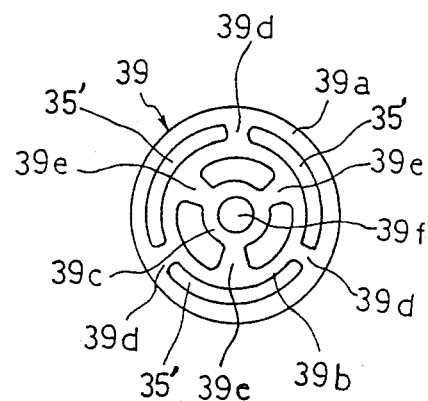
FIG. 2 is a front view of the disc type supporting member which is used in the magnetic section.
Figure 3:
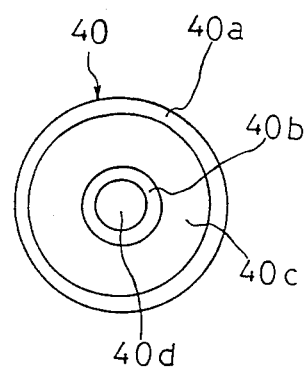
FIG. 3 is a front view of the disc type filter member which is used in the magetic section.

The magnetic section 3 has a static section and a movable section. The static section has a cylindrical case 32 made of magnetic material, a thick cylindrical core 33 made of magnetic material, and a coil assembly 35. A flange 33a of the core 33 engages one end of the case 32, the core 33 is concentrically laid with the case 32, and the coil assembly 35 is supported in a space made by the case 32 and the core 33. The movable section has the rod 36, a plunger 37 made of magnetic material, a disc type supporting members 39, 39 and a disc type filter members 40, 40. The rod 36 is inserted in a hollow area 33b, and the plunger 37 is laid at another end of the rod 36 and is magnetically attracted by the coil assembly 35. The disc type supporting members 39, 39 made of thin leaf spring supports the rod 36 at both ends, and the disc type filter members 40, 40 is overlaid with the supporting members 39, 39. The plunger 37 is fixed on another end of the rod 36, and has thick cylindrical shape, and the center area toward the core 33 has a concave 37a so that the extrusion 33c of the core 33 is inserted with minute space when the concave 37a is magnetically attracted. And circumference 37b faces an inner surface of the case 32 with a minute space. The disc type supporting members 39, 39, as shown in FIG. 2, has an outer ring 39a, middle ring 39b and an inner ring 39c. Furthermore, among them radial connecting parts 39d, 39d, 39d connect the outer ring 39a and the middle ring 39b; and radial connecting parts 39e, 39e, 39e connect the middle ring 39b and the inner ring 39c. At the center of the inner ring 39c, a hole 39f to pass the rod 36 is made. The supporting members 39, 39 has quite weak spring properties, so it facilitates axial move of the rod 36 and give little resistance against the move of the rod 36. The disc type filter members 40, 40, as shown in FIG. 3, has reinforcement limbs 40a, 40b, and the area 40c (between 40a and 40b) is a perforated thin membrane having semi liquid proof and air permiability. The center of the filter member 40 has a hole 40d to pass the rod 36, and as a whole, the filter member 40 has a quite flexible property.

The assembly of the magnetic section 3 is that; the core 33 with the coil assembly 35 fixed is inserted from one side of the case 32; the flange 33a is located and fixed by a step 32a, then the static section is completed; on the other hand, at an end section 36b on the rod 36, the plunger 37 encloses the section 36b with a stopper 41 which is made of non-magnetic material so that the stopper 41 prevents the core 33 from contacting the end of the concave 37a of the plunger 37; outside of the plunger 37, the disc type filter member 40 and supporting member 39, and a washer 42 are fitted in the section 36b and caulked, and then movable section is completed; the movable section is inserted from one end of the case 32; the limb 40a and the outer ring 39a are positioned and fixed in a dent 32b made at another end of the case 32; a circular holder 43 is set next to the supporting member 39 toward axially outside; the brim of another side of the case 32 is caulked; another end of the rod 36 is supported by the supporting member 39 and the filter member 40; at a small section 36a at one end of the rod 36, the filter member 40 and the supporting member 39 enclose the rod 36; from outside an elastic holder 45 also encloses the rod 36, and is fixed to the rod 36; then another side of the movable section is fixed on the static section.

The flange 31 made at another side of the valve sleeve 5 is inserted in one side of the case 32; the limb 40a of the filter member 40 and the outer ring 39a of the supporting member 39 are held between the flange 31 and the flange 33a of the core 33; and the brim of the case 32 is caulked to the circumference of the flange 31. By doing this assembly work is completed.

In the case that the filter member 40 and the supporting member 39 are caulked to the case 32 at another end of the magnetic section 3 (right side of FIG. 1), if the case 32 is caulked after inserting a ringed stopper (not shown) at the dent 32b to regulate the move of plunger 37 to another side, setting of initial position of the plunger 37 can be easily and correctly attained when the plunger 37 is under the motion. Accordingly the motion of the magnetic section 3 and precision of modulating property corresponding to input electric level of the pressure control valve 1 are largely enhanced.

The embodiment has the above stated elements, so pressure liquid (for example: oil) is applied to the application port 15 from a pump, etc., the oil is led to the space between the land 19 and 17 through the opening of the valve sleeve 5 and the land 19. Further the oil is applied to each apparatus in a hydraulic system in an automatic transmission, etc. from the output port 13 laid between the lands 17 and 19. The pressure P taken from the output port 13, at the same time, is led to the feedback port 16 through the feedback passage, and led to the space 22 between the lands 19 and 20. Based on difference of the cross section A1 of the land 19, and the cross section A2 of the land 20: (A1−A2), a feedback force P(A1−A2) is developed. Then the force is added to the force Fsol developed from the magnetic section 3: P(A1−A2)+Fsol, this force presses the spool 6 to the left direction. The spool 6 is moved to the point where the above forces and the force developed from the spring Fsp press the spool 6 to the right. By the move of the spool 6, the lands 17 and 19 provide the application port 15 and the drain port 12 with certain opening ratios. As a result, the output pressure P at the output port 13 corresponds to the input electric level sent to the magnetic section 3:

$$P = (Fsp - Fsol)/(A1 - A2) \tag{1}$$

Under the above operation, the coil assembly 35 is magnetized by the electrical signals, the core 33 and the plunger 37 both of which are made of magnetic material, and the case 32 compose magnetic circuit. At this time, magnetic flux passing through the core 33 runs through from outer surface and end of the extrusion 33c, the concave 37a of the plunger 37, outer surface 37b of the plunger to the case 32 which has minute space between the outer surface 37b. Consequently the plunger 37 is efficiently magnetized, and is attracted to the extrusion 33c by large magnetic force, and pressing force is applied to the pressure modulation section 2 through the rod 36. Even if oil leaks from minute slit between the hole 11 and the land 20 and runs toward the magnetic section 3, the filter member 40 which is overlaid with the inside of the supporting member 39 prevents oil from coming into the magnetic section 3. In the case that the filter member 40 is broken or not installed, the magnetic attractive section made up by the extrusion 33c and the concave 37a is located away from the pressure modulating section 2, so it is difficult for the oil to reach the magnetic attractive section.

On the other hand, on the pressure control valve in FIG. 1, the cross section A2 of the land 20 is made larger than the cross section A1 of the land 19, and the spring 7 is given a property weak enough only to contact the spool 6 and the rod 36. And the positions of the application port 15 and the drain port 12 are changed each other, the following formula is obtained:

$$P = (Fsol - Fsp)/(A2 - A1) \quad (2)$$

Due to the above modification, the output pressure P is increased according to the increment of the electric level input to the magnetic section 3. And to obtain the same property of the pressure control valve, it is suggested that the land 20 (in FIG. 1) is relocated to the left side of the land 17, and each port is made accordingly on the valve sleeve 5.

The main concept of the present invention is also materialized in the combination of the magnetic section 3 and a diaphragm type pressure control valve, or a relief valve type pressure modulating section instead of that of a reduction valve type and the magnetic section 3.

Figure 4:
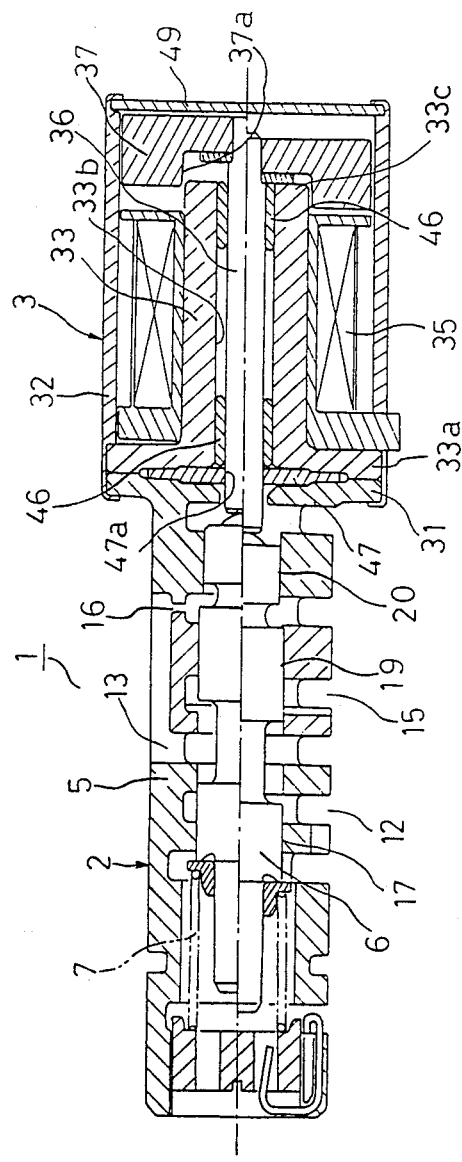
"FIG. 4 is a cross section view of the pressure control valve of the second embodiment.".

The second embodiment is explained along by FIG. 4. This embodiment is a partial modification of the first embodiment.

Instead of the disc type supporting members 39, 39, the rod 36 is supported by an axial supporting member such as bushes 46, 46 in the hollow area 33b. And instead of the disc type filter member 40 (sealing structure) a flexible and perforated disc type supporting member 47 is set between the flange 31 of the valve sleeve 5 and the flange 33a of the core 33. The supporting member 47 is made of flexible and perforated material, such as felt, to absorb minute foreign materials, and the member 47 has a center hole 47a to pass the rod 36 with a little clamping margin. Another side of the case 32 is sealed by a disc type member 49. Due to this the concentricity of the core 33 and the concave 37a of the plunger 37 is enhanced. Accordingly when operation, magnetic attraction less varies and stable performance is obtained. The supporting member 47 prevents foreign materials from entering the magnetic section 3 from the pressure modulating section 2, and the member 47 provides the rod 36 with less sliding resistance. Furthermore smooth assembly can be obtained.

As stated the bushes 46, 46 are placed between the rod 36 and the core 33. It is suggested that other axial supporting members such as a roller bearing having clamping margin in axial direction are also available.

Effects of the present invention are shown as follows: as the concave 37a of the plunger 37 and the extrusion 33c of the core 33 are located vis-a-vis and compose the magnetic attractive section, the inner diameter of the core 33 can be made small because only the rod 36 or the bushes 46, 46 are laid in the inside of the core 33. As a result, radial dimension of the magnetic section 3 can be reduced without losing properties of the magnetic section 3 because the diameters of the core 33 and the coil assembly 35 can be minimized. Such compactness enables system design for quite limited space like a hydraulic control system in an automatic transmission to have degree of freedom. As the magnetic attractive section in the magnetic section 3 is located away from the pressure modulating section 3, it is difficult for leaked fluid from the pressure modulating section 2 to reach the magnetic attractive section. Due to the above, fewer foreign materials are caught in the magnetic attractive section, so the magnetic section 3 and further the pressure control valve 1 can secure stable operation for long time. And as the structure of the magnetic section 3 is quite simple, machining and assembly are performed easily, and accordingly cost is reduced.

We claim:

1. A pressure control valve comprising:
    a pressure modulating valve section, and
    a magnetic section connected to one side of the pressure modulating valve section, said magnetic section including;
    a cylindrical case attached to the pressure modulating valve section,
    a coil assembly concentrically installed in said case and having a central opening,
    a cylindrical core concentrically installed in the central opening of said coil assembly and having a projection with an edge projecting beyond the coil assembly at a side opposite the pressure modulating valve section, and a hole therein,
    a rod situated in the hole of the cylindrical core to move along the core and having an outer end at a side opposite the pressure modulating valve section,
    a plunger fixed on the outer end of said rod and situated inside the cylindrical case at a minute distance therefrom, said plunger being made of a magnetic member and having a cylindrical concave formed in the center of the plunger at a side of the cylindrical core, the diameter of said concave being larger than that of the cylindrical core so that when the magnetic section is in non-magnetized condition, the edge of the cylindrical core is located adjacent to the plunger outside the cylindrical concave, and when the magnetic section is in magnetized condition, the projection of the cylindrical core is located in the cylindrical concave to allow magnetic flux to pass through the plunger and cylindrical core, said cylindrical concave and projection of said cylindrical core situated away from the pressure modulating valve section constituting a magnetic attractive section, and
    a stopper member made of a non magnetic material, said stopper member being installed in the cylindrical concave of the plunger so that when the magnetic section is in the magnetized condition, the projection of the core contacts the stopper member to prevent the plunger to directly contact the coil assembly.

2. A pressure control valve according to claim 1, wherein said magnetic section further comprises disc type supporting members made of leaf spring members, both ends of said rod being supported relative to the cylindrical case by means of the supporting members.

3. A pressure control valve according to claim 2, wherein said magnetic section further comprises disc type filter members overlaid on said disc type supporting members.

4. A pressure control valve according to claim 1, wherein said magnetic section further comprises an axial supporting member situated between the core and the rod for supporting the rod inside the core.

5. A pressure control valve according to claim 4, wherein said axial supporting members are bushes situated at end portions of the rod and cylindrical core.

* * * * *

UNITED STATES PATENT AND TRADEMARK OFFICE
CERTIFICATE OF CORRECTION

PATENT NO. : 4,838,518
DATED : June 13, 1989
INVENTOR(S) : Kouji Kobayashi et al It is certified that error appears in the above-identified patent and that said Letters Patent is hereby corrected as shown below:

At cover page, assignee's section, change "Aisin An Co., Ltd." to --Aisin Aw Co., Ltd.--

Signed and Sealed this

Sixth Day of February, 1990

Attest:

JEFFREY M. SAMUELS

Attesting Officer    Acting Commissioner of Patents and Trademarks